United States Patent [19]
Scheer

[11] 3,881,176
[45] Apr. 29, 1975

[54] APPARATUS FOR PRODUCING A SETTABLE DISTANCE MARKER

[76] Inventor: Kurt Scheer, Lichlenhainerstrasse 46, D-28 Bremen, Germany

[22] Filed: Apr. 19, 1973

[21] Appl. No.: 352,654

[30] Foreign Application Priority Data
Apr. 20, 1972 Germany............................ 2219296

[52] U.S. Cl. ............................................ 343/5 EM
[51] Int. Cl. ............................................. G01s 7/22
[58] Field of Search ................................ 343/5 EM

[56] References Cited
UNITED STATES PATENTS

| | | | |
|---|---|---|---|
| 2,653,312 | 9/1953 | Haworth ...................... | 343/5 EM X |
| 3,159,830 | 12/1964 | Macaulay...................... | 343/5 EM |
| 3,646,557 | 2/1972 | Scheer ......................... | 343/5 EM X |
| 3,648,283 | 3/1972 | Busch et al. ................. | 343/5 EM |

Primary Examiner—T. H. Tubbesing
Attorney, Agent, or Firm—Spencer & Kaye

[57] ABSTRACT

Apparatus for producing both a fixed distance marker and a settable distance marker on the display device of a ranging system operating on the reflected beam principle. Upon transmission of a transmitting pulse by the system, a clock pulse generator produces clock pulses which are counted by a pulse counter. The pulse counter produces a digital output which is indicative of the count and when this count is equal to a certain fixed value, a fixed distance marker is produced in the display device. The settable distance marker is produced on the display device with the assistance of a preselector circuit which can be controlled by an operator so as to select the position of the settable distance marker. The preselector includes a setting pulse generator for producing setting pulses which are counted by a setting pulse counter. The setting pulse counter produces a digital output which is indicative of its count. The count of both the pulse counter and the setting pulse counter are compared within a comparison device, which produces an output when a given ratio exists between the two counts. The output of the comparison device is coupled to the display device for producing the settable distance marker.

10 Claims, 4 Drawing Figures

APPARATUS FOR PRODUCING A SETTABLE DISTANCE MARKER

BACKGROUND OF THE INVENTION

The present invention relates to an improved apparatus for producing a settable, or adjustable, distance marker on the display device of a ranging system which operates according to the reflected beam principle.

An apparatus for producing an adjustable or settable distance marker and one or more fixed distance markers on the display device of a ranging system operating according to the reflected beam principle is disclosed in U.S. Pat. No. 3,646,557 issued Feb. 29, 1972. According to the apparatus disclosed in this patent, the output of a clock pulse generator, which is started by a control circuit upon the transmission of each ranging pulse by the system is connected in series with a pulse counter. The pulse counter provides output signals which are coupled to the display device for producing fixed given distance markers on the display when a given count has been reached, the count starting from the transmission of each ranging pulse. The settable distance marker is provided by a preselector, which is provided with a digital indicator and which is coupled to both the pulse counter and the display device. The preselector causes a settable distance marker to be produced on the display when the count of the pulse counter reaches a value which is set by the preselector.

According to the above identified patent, an apparatus is thus provided for producing both the settable distance marker and fixed distance markers with respect to identical scales. This is accomplished by using the clock pulse generator to supply clock pulses to the pulse counter, with the clock pulses being spaced from one another by the shortest time interval to be set and pulses for generating both the settable and the fixed distance markers being generated in dependence upon the counting of the clock pulses by the pulse counter.

According to the embodiment of the apparatus disclosed in the above-mentioned patent the settable distance marker is controlled by a preselector which includes several switches. Each of the switches has a plurality of switching positions with each switch being provided for a decimal position in the distance indication for the settable distance marker. The setting of each of these switches for a desired distance marker is selected by the operator of the ranging instrument.

The preselector arrangement disclosed in the patent has the drawback that the operation of such a group of switches is often very complicated and time consuming, especially if the system is operated at rough seas on the bridge of a ship, because normally the mutual setting of a plurality of switches must be changed simultaneously in order to set a desired distance to all decimal positions. In order to quickly and accurately set a settable distance marker, e.g. of exactly the distance of a located object of interest on the display instrument, it has been found to be especially undesirable to have to set each one of these decimal positions separately and independently of the others. It places a great stress on the operator of the ranging instrument to have to continuously make a decision which change in the decimal positions brings the settable distance marker closest to the selected object on the display screen without overshooting it. Moreover, if a high decimal position sets the settable distance marker too far away from the object then the range of the next lower decimal position might not be sufficient to compensate for this distance and consequently, if the higher decimal position is switched further, the next lower decimal position must at least be able to move back a considerable amount. Due to the large number of switches which must be operated in such a manner, i.e. a switch for each decimal position, this type of setting places too heavy a load on the operator of the ranging instrument, particularly if the distances of a plurality of located objects are to be rapidly determined in succession by the use of the settable distance markers.

SUMMARY OF THE INVENTION

An object of the present invention is to provide a ranging system in which both fixed and settable distance markers can be rapidly produced on a display device with a minimum of effort.

Another object of the present invention is to provide circuitry for producing settable distance markers in a ranging system which significantly minimizes the work required by the operator by eliminating the need for him to operate a plurality of switches in the preselector for the settable distance marker as in the above-mentioned prior known device.

A further object of the present invention is to provide a preselector having a single operating element for enabling the settable distance marker to be rapidly and easily set to approximately coincide with the object of interest and for such setting to be independent of the display range selected at that moment on the display device and of the original distance between the settable distance marker and the object now of interest.

A still further object of the present invention is to construct the operating element such that while it has a relatively simple construction, it is extremely durable, and will enable errors and faulty settings of the settable distance marker to be easily correctable.

These objectives are accomplished according to the present invention in that in an apparatus as generally described above for producing fixed and settable distance markers, the preselector for determining the positions of the settable distance markers includes a setting clock pulse generator which is controlled by the operator and which produces setting pulses which are fed into a setting pulse counter. A comparison circuit is coupled between the pulse counter used to produce the fixed distance markers and the setting pulse counter and compares the count from each of these counters. The comparison circuit produces an output pulse when a given relationship exists between the count of the setting counter and the count of the pulse counter. This pulse is then coupled to the display for producing the settable distance marker.

The preselector, therefore, need only include a single element to be operated by the operator, the element which controls the setting clock pulse generator. The setting clock pulse generator produces setting pulses which are counted by the setting pulse counter, with the instantaneous count being displayed on a digital display device connected to the setting pulse counter. This digital indication corresponds to the instantaneous distance of the settable distance marker from the transmitting location. If the control of the setting clock pulse generator is stopped at that moment where the displayed settable distance marker has reached the desired position, the setting clock pulse generator ceases to emit setting pulses and the attained position of the settable distance marker remains constant.

The use of the preselector of the present invention which includes the setting pulse counter controlled by the setting pulse generator, in a ranging system of the type disclosed in the above-mentioned U.S. Pat. No. 3,646,557, eliminates the need for a plurality of separately operated switches in the preselector and provides for the desired simplification of the operation of the system.

Digital comparators for comparing digital information are known per se, as in their general use in ranging systems. One example of the use of a digital comparator is shown by British Pat. No. 988,379 which discloses a digital comparator which releases the appropriate ranging information through the use of various symbols derived in a computer into the radar display at precisely that point in time when the electron beam passes the coordinates for the point of interest as defined by the radius and the angle. In a corresponding manner according to one embodiment of the present invention, the comparison device which is connected between the pulse counter and the setting pulse counter can be coincidence circuit. In such a circuit, the pulse for producing the settable distance marker would appear at the coincidence output when there is coincidence between the count of the pulse counter and the count of the setting pulse counter.

With the use of this coincidence circuit, the ratio between the counts is equal to 1. Other ratios at which the pulse is to appear, however, also could be utilized.

In a preferred embodiment, the comparison device includes a settable backwards counter. This backwards counter, which is connected in parallel at its input with the pulse counter so that it receives the clock pulses from the clock pulse generator, is initially set to the instantaneous position of the setting pulse counter before transmission of each ranging pulse, by the ranging system. The pulse for producing the settable distance marker is generated at the zero transfer output of the backwards counter. The transfer of the count of the setting pulse counter into the backwards counter is effected via a transfer circuit, which is triggered by the control circuit of the ranging system and the backwards counter then counts backwards, in the same clock pulse sequence as the pulse counter counts forward in a one to one relationship, so that when the backwards counter has reached zero, the pulse counter has reached the value which the setting pulse counter has transferred to the backwards counter and the coincidence condition between the pulse counter and the setting pulse counter is met. Consequently, when the backwards counter reaches zero, the pulse is generated at its zero transfer output.

Such an arrangement for the comparator is especially advantageous since it results in a substantial savings in circuitry because it is no longer necessary to check the totality of all possible counts for coincidence, since the function of the coincidence circuit is now taken over by a simple backwards counter with a transfer circuit, such as those generally utilized in integrated components. The zero transfer is accessible in such counter stages so that no further circuitry is required for generating the settable distance marker.

The setting pulse generator advantageously includes a clock pulse oscillator for producing the setting pulses, the frequency of which can be controlled. The output pulses of this oscillator are conducted through a switching device which permits the selective additive or subtractive feeding of the setting pulses into the setting pulses counter.

Such a clock pulse oscillator constitutes a significant simplification in operation of locating the settable distance marker on the display device since, if the settable distance marker is separated from the searched-for object by a large distance, it is possible to rapidly change the settable distance marker by giving a rapid sequence, i.e. by increasing the frequency, of setting pulses, while a fine correction is also possible with the use of a slower sequence, i.e. by decreasing the frequency, of the setting pulses when the desired position of the settable distance marker has almost been reached. If the desired position of the settable distance marker should inadvertently already have been exceeded, the switching device is simply switched over so that the next setting pulses are then subtracted from the present count of the setting pulse counter, i.e. the settable distance marker now moves in the opposite direction.

In order for all of these operating sequences to be easily carried out, the setting clock pulse generator can be controlled by a single operating element for controlling the positioning of the settable distance marker.

In a further embodiment of the present invention in order to enable the operator to be able to easily control the positioning of the settable distance marker, the clock pulse oscillator is connected at its control input with a differential amplifier whose input is connected in the diagonal branch of a bridge circuit. By controlling the balancing of this bridge circuit, it is possible to control the setting pulses produced by the setting clock pulse generator.

The element to operate the bridge circuit and thus the entire preselector in the preferred embodiment is simply a potentiometer. The movable contact of the potentiometer forms one input terminal of the bridge circuit and the resistor of the potentiometer forms the two arms of the bridge adjacent to the bridge input. A signal is provided at the sum output of the differential amplifier which is proportional to the degree to which the bridge circuit is unbalanced by the setting of the potentiometer. This signal is utilized to control the frequency of the clock pulse oscillator. The polarity of the unbalancing of the bridge circuit selected by the potentiometer is available as the output signal at one of two difference outputs of the differential amplifier.

In order to further simplify the operation of providing the settable distance marker, the operating element is provided with a return spring which returns the operating element to its neutral position when it is to be at rest in which position the bridge circuit is balanced and no output signal will be provided. Consequently, when the settable distance marker reaches the desired location, the operator of the ranging system need only release the operating element so that it returns to its rest position and no further change will take place in the positioning of the settable distance marker. In the embodiment where the potentiometer is the operating element, the return spring engages the movable contact and thus sets the potentiometer to a neutral position with respect to the bridge balancing when it is at rest.

The difference outputs of the differential amplifier are connected to the inputs of the switching device and control the selection of additive or subtractive feeding of the setting pulse into the setting pulse counter. This arrangement results in an advantageous combination of a plurality of control factors in the single operating element since merely by selectively deflecting the operating element both counting directions of the setting counter can be changed, and thus, also the direction of movement of the settable distance marker, and an increase or reduction in the frequency of the setting pulses can be selected in dependence on the degree of deflection of the operating element, thereby changing the speed of the change of the settable distance marker.

In a further embodiment of the present invention the operation is further simplified by the use of a logic circuit in the preselector, which is connected at its input with the output of the setting pulse counter, for preventing further subtractive feeding of the setting pulses from the setting clock pulse generator when the setting pulse counter has reached the zero position and retains the counter in the zero position. With this further embodiment of the present invention the operator can quickly set the counter back to zero by a wide deflection of the operating element and thus reset the settable distance marker without having to fear that the zero position of the setting counter may be passed (and the counter thus set to its highest possible count).

Additionally, a stop circuit may advantageously be provided to prevent further additive feeding of setting pulses into the setting counter when a given display range in the display device has been reached by the settable distance marker. This stop circuit prevents the settable distance marker from being set to a position which can no longer be seen on the display device. The occurrence of such a blockage of additive feeding of setting pulses can be detected by observing the digital display since when such a blockage occurs the digital display will not continue its count and thereby indicate to the operator that the selected setting of the settable distance marker would lie outside the display range of the display device.

While the above-mentioned patent provides a solution of the problem of producing coincidence between a fixed and a settable distance marker, the present invention provides, in a manner which is very advantageous for practical application, a device for producing a settable distance marker in cooperation with the device for producing fixed distance markers in which the operation remains simple and free of errors even when the system is utilized under difficult conditions.

While the present invention has been devised for a special field of application, it, however, also can be utilized in other setting and control processes effected in the digital art. One such particular field of application is the positioning of tools or setting of dials in radios. For example, the operating element at the setting clock pulse generator can give the intended position (e.g. a desired receiving frequency) and this is indicated in the digital display, the actual position corresponds to the instantaneous position of the pulse counter and a follow-up system receives a stop instruction by the output of the comparison circuit when coincidence exists between the intended and the actual position. A particularly favorable arrangement for tuning HF receivers can be obtained by setting the setting counter and thus the digital display for the numbers of a desired channel. With a digital/analog converter and, if necessary correction members, the digital information of the setting counter can directly provide the voltage for the tuning of the receiver by the use of variable capacitance diodes, the operation of which is well known.

DESCRIPTION OF THE PREFERRED EMBODIMENTS

Figure 1:
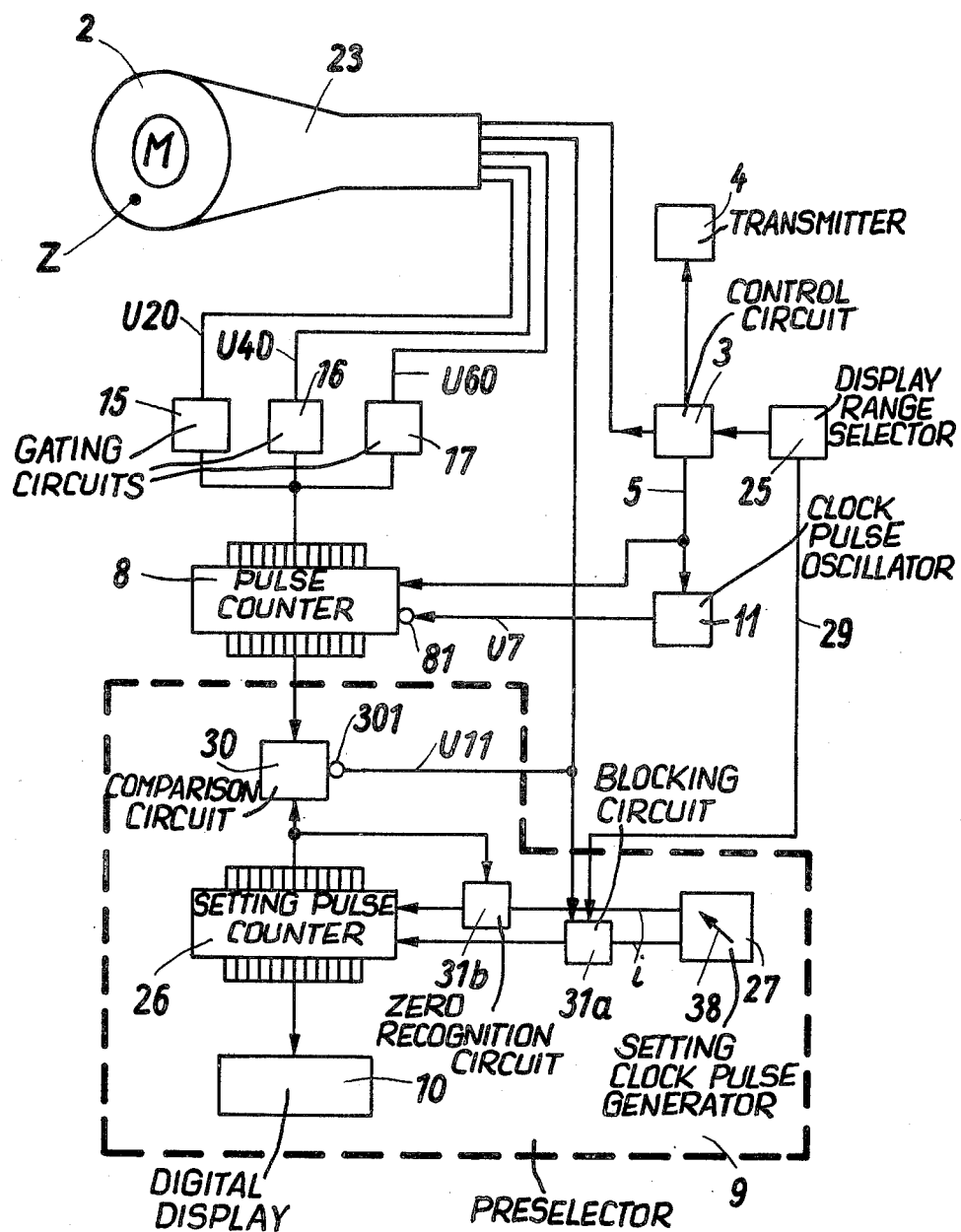
FIG. 1 is a block diagram circuit of a ranging system in which the preselector for setting the settable distance markers is constructed in accordance with the present invention.

As shown in FIG. 1, a reflected beam ranging device, which is of the same general type described in the above-mentioned U.S. Pat. No. 3,646,557, is provided with a display device in the form of a picture tube 23 with a screen 2 to display located objects Z in a panoramic display. A control circuit 3 controls in periodic sequence a transmitter 4 and thereby causes a synchronous deflection of the cathode beam of the picture tube 23; the echo receiver of the system has not been separately shown.

The control circuit 3 also triggers, via a line 5, a clock pulse generator 11 to produce clock pulses U7 in the same manner as described in the above-mentioned U.S. patent. These clock pulses are fed into a pulse counter 8 through the counting pulse input 81. The pulse counter 8 is reset to zero by control circuit 3 before each transmitted ranging pulse so that it can start its count with reference to each ranging pulse. The control circuit 3 is connected at its input with a display range selector 25 which selects the display range to be displayed on the screen 2. The digital output of pulse counter 8 is connected to the gate circuits 15, 16 and 17, which respond to various desired counts of the pulse counter so as to form pulses U 20, U 40 and U 60 to produce fixed, given distance markers (not shown) at various locations on the display device.

A settable distance marker is also provided on the display device with the assistance of a settable preselector 9. This preselector 9, in accordance with a particularly advantageous embodiment of the present invention, includes a setting pulse counter 26 which can selectively count, in either direction, additively or subtractively, such as for example a forward/backward counter. A setting clock pulse generator 27 selectively feeds setting pulses $i$ into an additive or subtractive input of the counter 26 so as to control the direction of counting. An operating element 38 is provided within the setting clock pulse generator 27 for controlling the output of the setting pulses $i$ so as to select between subtractive and additive counting as well as to select the repetition frequency of the setting pulses $i$. The details of this operating element will be discussed below in connection with FIG. 3.

A comparison circuit 30 is connected between the outputs of pulse counter 8 and the setting pulse counter 26 as shown in FIG. 1. The comparison circuit compares the count of both the pulse counter 8 and the setting pulse counter 26 and produces an output pulse whenever a given ratio exists between these counts. This comparison circuit 30 can be a coincidence circuit at whose output 301 a pulse U11 appears for each radial deflection direction to produce a distance marker M which is settable in its diameter and circular after one cycle of deflection, whenever the pulse counter 8 shows a count which corresponds to that of the setting pulse counter 26, i.e. if a coincidence ratio of 1 is provided. In synchronization with the production of the settable distance marker, the count of setting counter 26 is indicated by a digital display 10 which thus shows the instantaneous position of the settable distance marker M.

Figure 4:
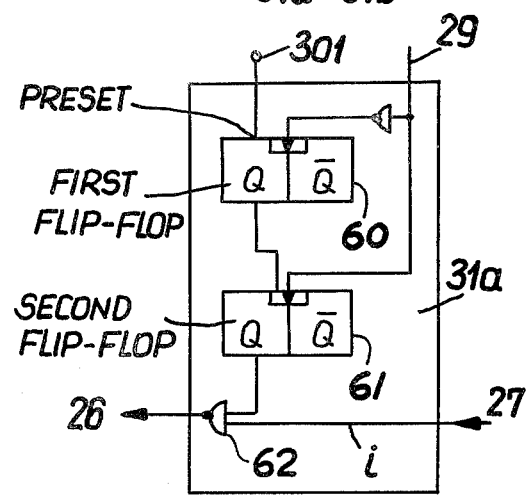
FIG. 4 is a block diagram of a blocking circuit shown in FIGS. 1, 2 and 3.

A blocking, or stop, circuit 31a whose input is connected with the display range selector 25 via control line 29 is provided in order to prevent further feeding of setting pulses $i$ into the additive input of the setting pulse counter 26 if the presently set distance marker M has been selected too wide, i.e. the marker leaves the display range selected by the display range selector 25. As shown in FIG. 4, the blocking circuit 31a for instance, contains two settable flip-flops 60 and 61 and a NAND-gate 62. The first flip-flop 60 has its present input connected with the output 301 of the comparison circuit 30, and its output connected with the signal input of the second flip-flop. The clock inputs of the two flip-flops 60 and 61 are connected via line 29 with the range selector 25, so that the first flip-flop 60 jumps with the beginning of the display range and the second flip-flop 61 takes over the output signal of the first flip-flop at the end of the display range. The output signal of the second flip-flop 61 opens the NAND-gate 62 for setting pulses $i$ or closes it, when the count of the setting pulse counter 26 is too high.

In order to simplify the operation of the preselector 9, a further logic circuit is provided in the form of a zero recognition circuit 31b, whose control input is connected with the output of the setting counter 26 and which interrupts further subtractive feeding of the setting pulses $i$ is to the setting pulse counter 26 when the setting pulse counter 26 has reached the zero position so that the counter 26 is stopped in its zero position. This arrangement provides a further simplification of the operation because when the settable distance marker M is removed, the setting counter 26 can be reset to zero as rapidly as desired without there being the danger that the counter will inadvertently go beyond zero.

Figure 2:
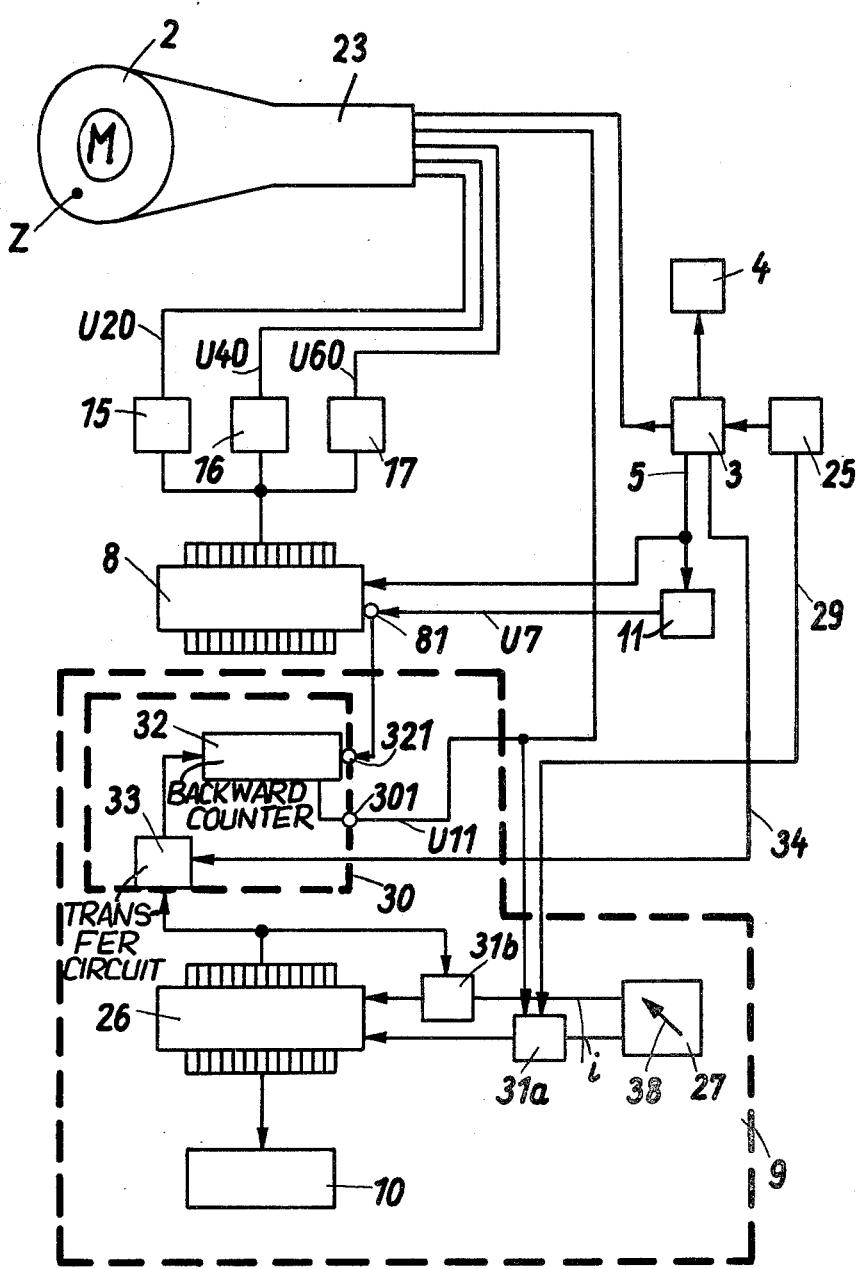
FIG. 2 is a block diagram circuit according to FIG. 1 in which the comparison circuit of the preselector includes a backwards counter together with a transfer circuit.

A reflected beam ranging system similar to that shown in FIG. 1 but in which the comparison circuit 30 includes a backwards counting counter 32 and a transfer circuit 33 is shown in FIG. 2. The transfer circuit 33 is triggered via a trigger line 34 by the control circuit 3. Upon being triggered, the transfer circuit 33 transfers the present count of setting pulse counter 26 to the backwards counting counter 32. The backwards counting counter 32 receives, at its counting pulse input 321, the clock pulses U7 from the clock pulse generator 11, as does pulse counter 8. The clock pulses U7 cause the backwards counter 32 to count from the set count from counter 26 to zero. When the backwards counter 32 is counted empty, i.e. the counter reaches zero, a pulse U 11 appears at its zero transfer output which is coupled to the display device to produce the settable distance marker M at that moment when the pulse counter 8 has reached the originally given count of the setting pulse counter 26.

Figure 3:
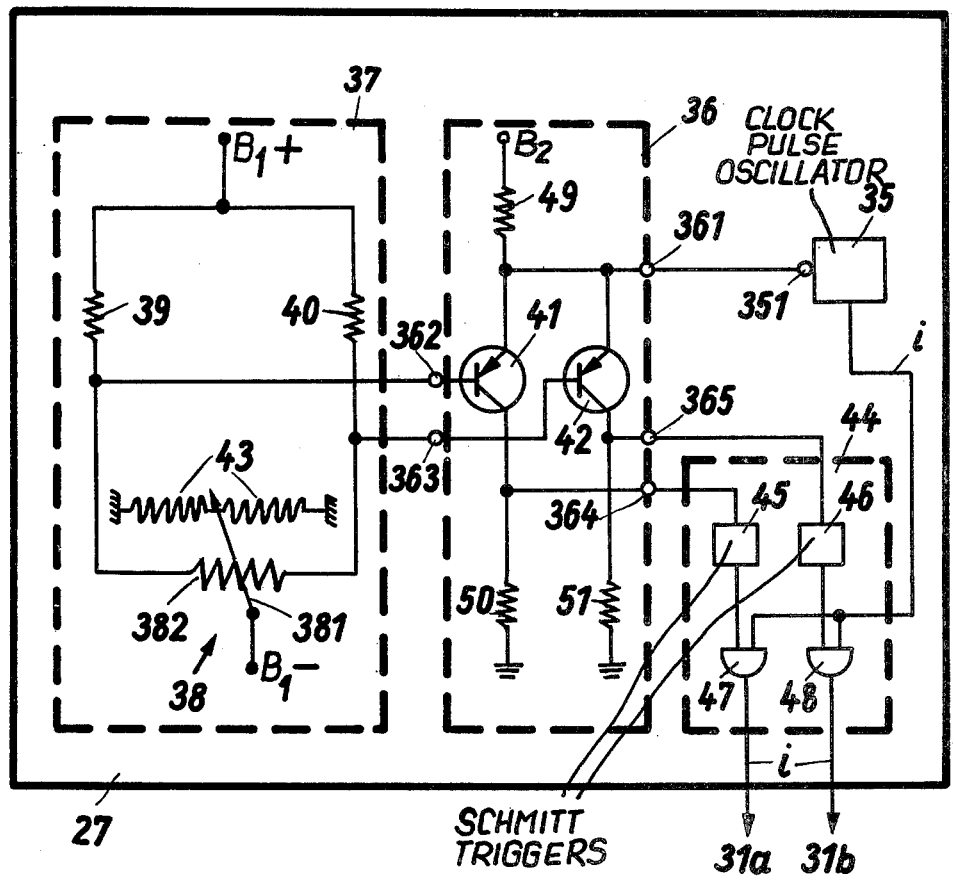
FIG. 3 is a block diagram circuit of a preferred embodiment of the setting clock pulse generator shown in FIGS. 1 and 2.

The setting clock pulse generator 27 includes, as shown in FIG. 3, a clock pulse oscillator 35, the frequency of which can be controlled. The frequency control input 351 of the oscillator 35 is connected with a sum output 361 of a differential amplifier 36. As shown, the differential amplifier 36 may include two transistors 41, 42 which are connected to a common emitter resistor 49 and hence a bias voltage $B_2$, and to two separate collector resistors 50, 51, respectively. The differential amplifier 36 is connected in the diagonal branch of a bridge circuit 37 via inputs 362, 363, the symmetry, i.e. balancing, of the bridge circuit 37 being changeable by a potentiometer 38 which acts as the operating element.

One pole of the bridge input $B_1$ is connected to the movable contact terminal 381 of potentiometer 38. Resistor 382 of the potentiometer 38 thus forms the two arms of the bridge adjacent this pole. The other two arms of the bridge are formed by two fixed resistors 38, 40, at whose connecting point the other pole of the bridge input $B_1$ is connected. The movable contact terminal 381 of potentiometer 38 is preferably engaged by a reset spring 43 which pulls the terminal 381 into a rest position exactly in the center of the resistor 382 of the potentiometer 38. Consequently, the bridge will be balanced in the rest position, i.e. unbalancing of the bridge can only occur when an operator actually moves the movable contact terminal 381 out of its rest position. If potentiometer 38 is moved out of its rest position, the bridge becomes unbalanced, or detuned, this unbalancing becoming apparent, depending on its polarity, as an output signal at one of the difference outputs 364, 365 of the differential amplifier 36.

AT the sum output 361 of the differential amplifier 36, an output signal, which is proportional to the degree to which the bridge is unbalanced, is present as the control signal for the clock pulse oscillator and is fed to the frequency control input terminal 351 of the oscillator 35. The difference outputs 364, 365 of the differential amplifier 36 are connected with a switching device 44 which has at its inputs two Schmitt triggers 45, 46 through which the output signals of the differential amplifier 36 are transferred as defined control pulses to two gating circuits 47, 48, respectively.

The second inputs of the gating circuits 47, 48 are connected to the output voltage of the clock pulse oscillator 35, so as to receive the sequence of the setting pulses $i$. Depending on the direction in which the potentiometer 38 is moved out of the rest position, either gating circuit 47 or gating circuit 48 is enabled and thus the setting pulses $i$ reach either the additive or the subtractive counting input of setting pulse counter 26. Thus the instantaneous count of setting pulse counter 26 is either increased or decreased and correspondingly, the settable distance marker M changes its position on screen 2 to indicate either higher or lower distance values from the center of the circle wich represents the position of the reflected beam ranging system.

It will be understood that the above description of the present invention is susceptible to various modifications, changes and adaptations and the same are intended to be comprehended within the meaning and range of equivalents of the appended claims.

I claim:

1. In an apparatus for producing a fixed distance marker and a settable distance marker on a display device of a ranging system which operates according to the reflected beam principle and including: a clock pulse generator for producing clock pulses; a pulse counter connected in series with the output of the clock pulse generator for counting the clock pulses and producing a digital output indicative of the count; control means for causing the clock pulse generator to produce clock pulses and the pulse counter to be reset whenever a ranging pulse is transmitted by the ranging system; means connected to the output of the pulse counter for producing a fixed distance marking pulse when the pulse counter produces a digital output indicative of a preset fixed count of the clock pulses; means for coupling the fixed distance marking pulse to the display device for producing a fixed distance marker thereon; settable preselector means coupled to the pulse counter for producing a settable distance marking pulse indicative of a preselected count of the pulse counter and for displaying such preselected count on a digital display; and coupling means for coupling the settable distance marking pulse to the display device for producing a settable distance marker thereon, the improvement wherein said preselector means comprises: setting pulse generator means for producing a plurality of setting pulses and including a setting control means for controlling the output pulses therefrom; setting counter means coupled to the output of said setting pulse generator means for counting the setting pulses and for producing a digital output indicative of such count; comparision means coupled between the output of said pulse counter and the output of said setting counter means for comparing the count of said pulse counter and of said setting counter means and for producing an output pulse whenever a given ratio exists between the count of said pulse counter and of said setting counter means, said comparison means including a backwards counter having its counting input connected to the output of said clock pulse generator for receiving the clock pulses and having a zero transfer output which forms the output of said comparison means, and a transfer circuit means coupled between said backwards counter and the output of said setting counter means for transferring the count of said setting counter means to said backward counter in response to the transmission of a ranging pulse; and wherein said coupling means couples the output pulse from said comparison means to the display device to produce the settable distance marker on the display device.

2. An apparatus as defined in claim 1 wherein said transfer circuit means is coupled to the output of said control means and is responsive to an output thereof indicating the transmission of a ranging pulse.

3. In an apparatus for producing a fixed distance marker and a settable distance marker on a display device of a ranging system which operates according to the reflected beam principle and including a clock pulse generator for producing clock pulses, a pulse counter connected in series with the output of the clock pulse generator for counting the clock pulses and producing a digital output indicative of the count, control means for causing the clock pulse generator to produce clock pulses and the pulse counter to be reset whenever a ranging pulse is transmitted by the ranging system, means connected to the output of the pulse counter for producing a fixed distance marking pulse when the pulse counter produces a digital output indicative of a preset fixed count of the clock pulses, means for coupling the fixed distance marking pulse to the display device for producing a fixed distance marker thereon, settable preselector means coupled to the pulse counter for producing a settable distance marking pulse indicative of a preselected count of the pulse counter and for displaying such preselected count on a digital display and coupling means for coupling the settable distance marking pulse to the display device for producing a settable distance marker thereon, the improvement wherein said preselector means comprises: setting pulse generator means for producing a plurality of setting pulses and including a pulse oscillator for producing the setting pulses at a controllable frequency and a setting control means for controlling the frequency of the setting pulses produced by said pulse oscillator; setting counter means coupled to the output of said setting pulse generator means for counting the setting pulses and for producing a digital output indicative of such count; and comparision means coupled between the output of said pulse counter and the output of said setting counter means for comparing the count of said pulse counter and of said setting counter means and producing an output pulse whenever a given ratio exists between the count of said pulse counter and of said setting counter means; and wherein said coupling means couples the output pulse from said comparison means to the display device to produce the settable distance marker on the display device.

4. An apparatus as defined in claim 3 wherein said comparison means is a coincidence means for providing an output when the count of said pulse counter and of said setting counter means coincide.

5. In an apparatus for producing a fixed distance marker and a settable distance marker on a display device of a ranging system which operates according to the reflected beam principle and including a clock pulse generator for producing clock pulses, a pulse counter connected in series with the output of the clock pulse generator for counting the clock pulses and producing a digital output indicative of the count, control means for causing the clock pulse generator to produce clock pulses and the pulse counter to be reset whenever a ranging pulse is transmitted by the ranging system, means connected to the output of the pulse counter for producing a fixed distance marking pulse when the pulse counter produces a digital output indicative of a preset fixed count of the clock pulses, means for coupling the fixed distance marking pulse to the display device for producing a fixed distance marker thereon, settable preselector means coupled to the pulse counter for producing a settable distance marking pulse indicative of a preselected count of the pulse counter and for displaying such preselected count on a digital display and coupling means for coupling the settable distance marking pulse to the display device for producing a settable distance marker thereon, the improvement wherein said preselector means comprises: setting pulse generator means for producing a plurality of setting pulses and including a setting control means for controlling the output pulses therefrom; setting counter means coupled to the output of said setting pulse generator means for counting the setting pulses and for producing a digital output indicative of such count, said setting counter means being a forward-/backward counter and said setting pulse generator means including switching means for selectively controlling the feeding of the setting pulses into said setting counter means so as to control the direction of counting; comparison means coupled between the output of said pulse counter and the output of said setting counter means for comparing the count of said pulse counter and of said setting counter means and producing an output pulse whenever a given ratio exists between the count of said pulse counter and of said setting counter means; and wherein said coupling means couples the output pulse from said comparison means to the display device to produce the settable distance marker on the display device.

6. An apparatus as defined in claim 5 wherein said setting pulse generator means further includes a pulse oscillator for producing the setting pulses at a selectable frequency and said setting control means controls the frequency of said pulse oscillator and controls said switching means.

7. An apparatus as defined in claim 6 wherein said setting control means includes a bridge circuit having a potentiometer connected within said bridge circuit such that its movable contact forms an input terminal of said bridge and its resistor forms the two arms of said bridge adjacent said input terminal, and a differential amplifier connected in the diagonal branch of said bridge circuit and having a sum output for providing a sum output signal, which is indicative of the degree of unbalance of the bridge circuit, and two difference outputs for providing output signals indicative of the direction of unbalance of said bridge circuit; said pulse oscillator has its frequency control input connected to said sum output of said differential amplifier; and said switching means includes two gating means, each connected to one of the difference outputs of said differential amplifier, and controlled by the respective output signal therefrom.

8. An apparatus as defined in claim 7 further including a return spring for maintaining said movable contact of said potentiometer in a neutral position when said contact is free of external forces.

9. An apparatus as defined in claim 5 further comprising logic means coupled to the output of said setting counter means and the output of said setting pulse generator means for blocking the feeding of further setting pulses into said setting counter means when the count therein reaches zero.

10. An apparatus as defined in claim 5 further comprising a display range selector means connected to said control means for selecting the display range for the display device and providing an output indicative of such selected range and blocking means coupled to the output of said display range selector means for blocking the additive feeding of setting pulses into said setting counter means when the selected settable distance marker would go beyond the limits of the selected display range of the display device.

* * * * *